United States Patent [19]

Prenzel

[11] 4,037,697

[45] July 26, 1977

[54] HYDRAULIC CLUTCH ACTUATING SYSTEM

[75] Inventor: Karl Prenzel, Neu-Katzwang, Germany

[73] Assignee: Ardie-Werk, GmbH, Nurnberg, Germany

[21] Appl. No.: 499,539

[22] Filed: Aug. 21, 1974

[30] Foreign Application Priority Data

Aug. 21, 1973  Germany ............................. 2342234

[51] Int. Cl.² .......................................... A16D 25/00
[52] U.S. Cl. .................... 192/91 R; 192/82 T; 192/109 F; 60/329
[58] Field of Search ............... 192/82 T, 109 F, 91 R; 60/329

[56] References Cited

U.S. PATENT DOCUMENTS

| 2,005,731 | 6/1935 | Ernst et al. | 60/329 |
| 2,376,545 | 5/1945 | Livermore | 192/109 F |
| 2,935,999 | 5/1960 | Hock et al. | 192/109 F |
| 3,204,730 | 9/1965 | Alfieri et al. | 192/91 R |
| 3,263,782 | 8/1966 | Smirl et al. | 192/85 R |
| 3,339,672 | 9/1967 | Crandall | 192/13 R |
| 3,417,845 | 12/1968 | Swanson | 192/87.19 |

Primary Examiner—Benjamin W. Wyche
Attorney, Agent, or Firm—Edward R. Weingram

[57] ABSTRACT

Electro-hydraulic apparatus for actuating a friction clutch has a hydraulic actuating motor and electrical or electronic means to control the hydraulic motor through a control valve system, which includes at least one viscosity independent flow regulator to control flow of hydraulic fluid to or from the motor during operation of the clutch.

6 Claims, 4 Drawing Figures

HYDRAULIC CLUTCH ACTUATING SYSTEM

BACKGROUND OF THE INVENTION:

1. Field of the Invention.

This invention relates to means for electrohydraulically actuating a friction clutch, in particular those of motor vehicles, using a hydraulic actuating motor and having an electric or electronic control device to control the hydraulic motor through a valve.

2. Description of the Prior Art.

Hydraulic actuation of clutches is well known, and it is also well known to control them electrically or electronically. However, this control has heretofor only been applied to the initiation of the disengagement and engagement of the clutch, rather than to the entire engagement and/or disengagement process.

In the known electrically or electronically controlled hydraulic actuating devices for clutches, problems arise in achieving satisfactory performance which is not dependent upon or effected by the temperature of the hydraulic fluid used in operating the device. Heretofor it has not been possible to develop a device of the kind in question which meets all operating requirements and also avoids the drawback of being dependent upon the hydraulic fluid temperature.

SUMMARY OF THE INVENTION

To overcome the problems of the prior art, the present invention provides apparatus for electrohydraulically actuating a friction clutch of, for example, a motor vehicle, using a hydraulic actuating motor and having an electric or electronic control device to control the hydraulic motor through a control valve system, in which valve system there is at least one viscosity-independent flow regulator associated with the control valve and which controls the flow of fluid to or from the motor for operation of the clutch.

The apparatus of the present invention not only controls the start of the disengagement or engagement of the clutch but controls the whole disengaging or engaging process as well, and can vary the speed of re-engagement, so that the clutch operation is virtually free from shocks. Moreover, the clutch performance is independent of the prevailing temperature of the fluid employed, generally hydraulic oil. The hydraulic fluid is supplied from a source of fluid under pressure and returns to a reservoir that is open to atmosphere. From the reservoir the fluid can be sucked up again and pumped into a closed pipe system so that a closed fluid pressure circuit is obtained.

Accordingly, it is object of the present invention to provide means to electrohydraulically actuate a friction clutch as described above, which always operates smoothly and reliably and without judder, regardless of the prevailing temperature of the hydraulic fluid which is employed, so that the associated clutch is not only disengaged gently but in particular is also re-engaged smoothly.

Other objects and advantages will be apparent from the following description of several embodiments of the invention, and the novel features will be particularly pointed out hereinafter in connection with the appended claims.

DESCRIPTION OF THE PREFERRED EMBODIMENTS

Figure 1:
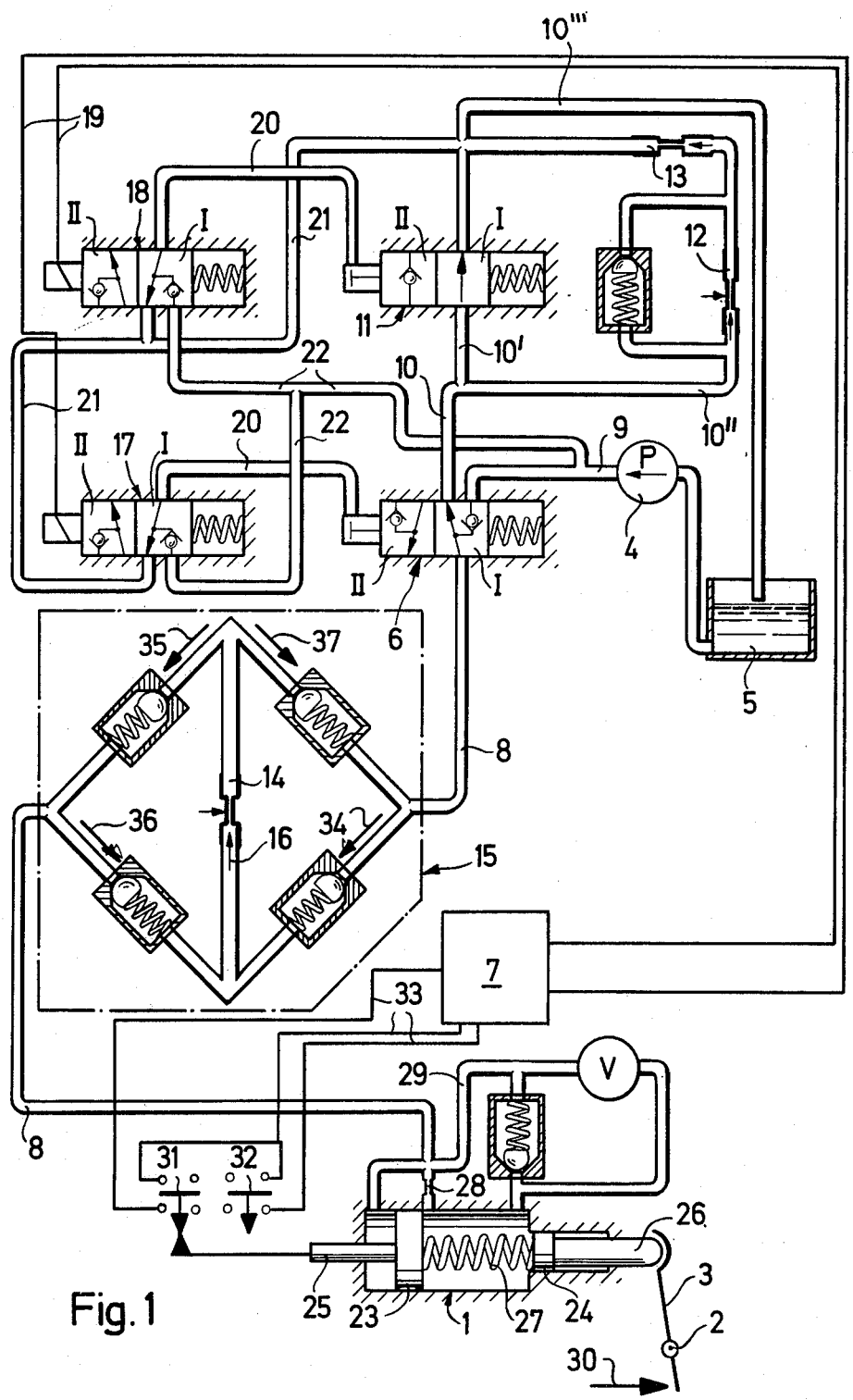
FIG. 1 is a fluid circuit diagram of a first embodiment of a clutch actuating device built in accordance with the teachings of the present invention.

Referring first to FIG. 1, a hydraulic actuating motor in the form of a ram 1 serves for moving a two-armed lever 3, which pivots about an axis 2, to disengage or engage a friction clutch (not shown).

The ram 1 can be connected at will to a source 4 of hyaraulic fluid under pressure and to a reservoir 5, under the control of a valve 6. The operation of this value 6 is controlled by an electric control device 7, through associated valves.

The ram 1 is connected to the valve 6 through a pipe 8. The valve 6 is in turn connected through a pipe 9 to the source 4 and through a pipe 10 to the reservoir 5.

The pipe 10 has two branches 10' and 10" mutually in parallel, in which there are connected respectively a shut-off valve 11 and a viscosity-independent flow regulator 12, of known design, as well as a restriction 13 which follow the latter and is in series with it. The operation of the shut-off valve 11 is likewise controlled from the electric control device 7 through associated valves. It is important to note that the regulator 12 is of a kind which controls the flow through it to a preset value, regardless of variations in temperature (and therefore of viscosity) of the fluid passing through it.

In connecting pipe 8 between the ram 1 and its control valve 6 there is likewise connected a second viscosity-independent flow regulator 14, of known design, matching the regulator 12. The regulator 14 is connected through a hydraulic rectifier bridge 15 of check valves arranged so that the regulator 14 always has a flow through it in the direction of the arrow 16, regardless of whether the fluid is flowing from the valve 6 to the ram 1 or in the opposite direction.

Both the control valve 6 and the shut-off valve 11 are hydraulically actuated, each being in fact controlled by an electromagnetic primary valve 17 or 18. These valves 17 and 18 are each connected through an electric lead 19 to the electric control device 7 in the nature of a switching and/or relay type device that can be manually controlled to a given condition and then held in that condition or moved to a sequential condition by an electric current. Furthermore, they are each connected respectively through a pipe 20 to the actuating cylinder of the associated valve 6 or 11 and through a pipe 21 to the reservoir 5 and through a pipe 22 to the source 4.

The two flow regulators 12 and 14 are adjusted to the required flow rate when the apparatus is first set up. This flow rate remains constant independently of the prevailing temperature of the fluid.

The throttle or restriction 13 produces a predetermined back pressure which serves as the control parameter for the regulator 12.

The ram 1 has two axially movable pistons 23 and 24, having respective piston rods 25 and 26 projecting through the ends of the ram cylinder. The space between the two pistons 23 and 24 is filled with a quantity fluid under pressure which normally remains constant so that the movements of the pistons 23 and 24 are coupled together in such a way that movement of the piston 23 always corresponds to a constant proportional movement of the piston 24 and vice-versa. Between the two pistons 23 and 24 there is a compression spring 27. Connected to the space between the two pistons 23 and 24 there is a breather pipe 28 having a very restricted opening of, for example 0.6 to 0.8 mm to compensate for leakages, and also a filler pipe 29.

This construction of the ram 1 with two pistons 23 and 24 allows for easy adjustment to compensate for wear of the clutch. The lever 3 is spring-loaded in the direction of the arrow 30.

At predetermined axial positions of the pistons 23 and 24 in the ram cylinder the piston rod 25 actuates two electric switches 31 and 32 which is electrically connected to the control device 7 through wires 33.

In FIG. 1 the device is illustrated in its rest condition with the clutch engaged. The electromagnetic primary valves 17 and 18 are not energized and occupy the position I in which the connecting pipe 20 to the associated valve 6 or 11 is connected through the pipe 21 and 10''' reservoir 5 so that the valves 6 and 11 likewise take up the positions I, in which the pipe 8 is connected to the pipe 10 and through its branches 10' and 10''' to the reservoir 5. The ram 1 is held in the position illustrated by the spring that loads the lever 3 in the direction of the arrow 30.

When the clutch is to be disengaged, the valve 17 is energized from the control device 7 and moves to the position II. This allows fluid to pass through the pipe 20 to the valve 6 from the source 4 and this valve is likewise shifted to the position II. This puts the pipe 8 in communication with the source 4. Fluid flows in the direction of the arrows 34, 16 and 35, through the rectifier 15 and the flow regulator 14, to the ram 1 which pivots the lever 3 in a direction opposite to that of the arrow 30 and disengages the clutch. This fact is signaled to the control device 7 by operation of the switch 32.

Engagement of the clutch is performed in two stages, the first rapid and the second slow. First, the primary valve 17 is diactuated by the control device 7, cutting the current to valve 17 so that it returns to the position I under the influence of the spring in the right side of the valve, and so the valve 6 likewise returns to its position I. Fluid under pressure then flows from the ram 1 in the direction of the arrows 36, 16 and 37 through the rectifier 15 and the flow regulator 14 to the pipe 8, through the pipe 10 and its branches 10' and 10''' beck to the reservoir 5.

To begin the second stage, the other primary valve 18 is energized by the control device 7, so that it shifts to the position II and allows fluid to pass from the source 4 through the pipe 20 to the shut-off valve 11, which shifts to its position II. Fluid under pressure from the pipe 8 can then only pass to the reservoir 5 through the flow regulator 12, restriction 13 and branches 10''', so the pistons 23 and 24 of the ram 1 can only return slowly to the position shown in FIG. 1 under the action of the spring which loads the lever 3 in the direction of the arrow 30.

As soon as this piston is reached, the switch 31 is actuated and tells the control device 7 that the clutch is engaged. The valve 18 is then de-energized and returns to its position I, causing the shut-off valve 11 to do likewise.

From the above it can be seen that when the clutch is fully engaged, switch 31 will be closed signalling control device 7 to continually interrupt current to electromagnetic valves 17 and 18. When the clutch is fully disengaged, switch 32 will be closed signalling control device 7 to continually provide current to electromagnetic valve 17 while interrupting current to electromagnetic valve 18. When the clutch is to be engaged, control device 7 is positioned so that current is discontinued to electromagentic valve 17 (phase I) and then subsequently supplied to electromagnetic valve 18 (phase II), until switch 31 is closed thereby signalling control device 7 to discontinue current to electromagnetic valve 18.

Figure 2:
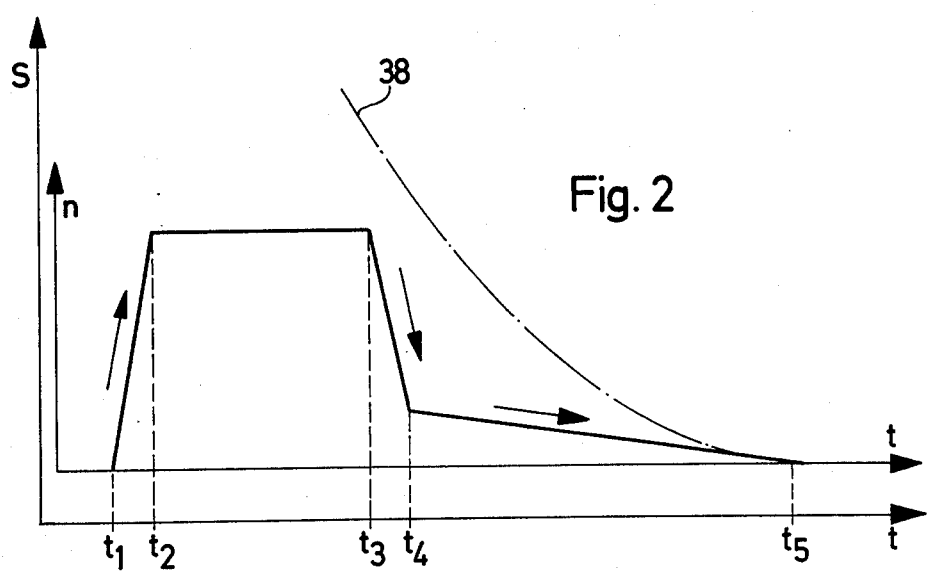
FIG. 2 illustrates graphically the manner of operation of the apparatus of FIG. 1.

In FIG. 2, the course S of movement of the lower end, as viewed in FIG. 1, of the lever 3 and, therefore, of the movable part of the clutch is illustrated graphically in relation to time $t$. The disengagement of the clutch starts at time $t_1$ and ends at time $t_2$. At time $t_3$ the engagement of the clutch starts, at least the first rapid stage of it. At time $t_4$ begins the second, slower stage in the engagement of the clutch, ending at time $t_5$. The gradient of the straight lines between times $t_1$ and $t_2$ and between times $t_3$ and $t_4$ is the same and signifies that on disengagement of the clutch and during the first phase of engagement the pistons 24 and 23 move with the same speed, which is determined by the flow regulator 14, which is operative in both cases. The inclination of the straight line between the times $t_4$ and $t_5$, i.e. the speed of movement of the piston 24 and, accordingly, of the piston 23 during the second stage of the engagement of the clutch is dependent on the adjustment of the flow regulator 12 which, like the flow regulator 14, always allows the same flow rate independently of the temperature of the fluid in the system.

The curve 38 shown in broken lines illustrates the relationship between the speed difference $n$, between the two relatively movable members of the clutch, and the time $t$. It will be seen that this speed difference $n=0$ at the instant $t_5$.

Figure 3:
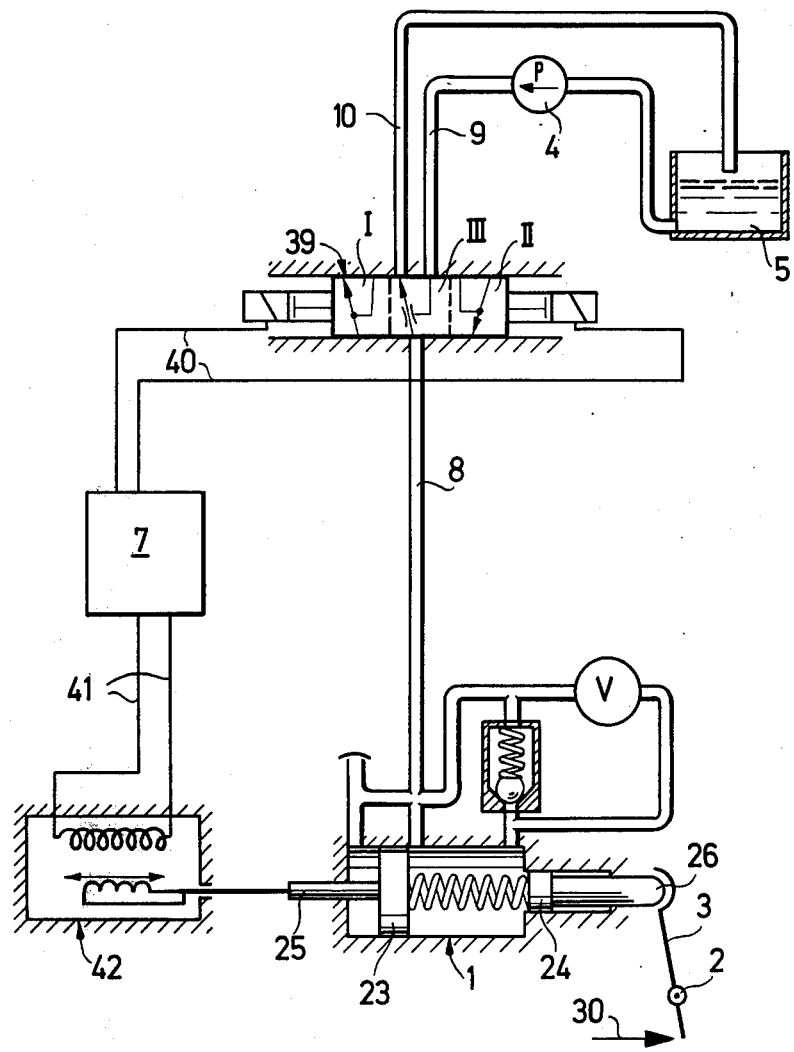
FIG. 3 is the fluid circuit diagram of another embodiment of a clutch actuating device built in accordance with the teachings of the present invention.

In FIG. 3, there is illustrated another embodiment of the device according to the invention. It differs from that of FIG. 1 in that the ram 1 is connected through the pipe 8 to a servo valve 39 which is connected in turn to the source 4 of fluid pressure and to the reservoir 5. The servo valve 39 is controlled through electric connections 40 from the control device 7 which is connected through leads 41 to an inductive position transducer 42. This is connected to the piston rod 25 of the piston 23 of the ram 1 and signals continuously to the device 7 the instantaneous axial position of the piston 23 and accordingly of the piston 24 in the cylinder of the ram.

The servo valve 39 is capable of taking up two end positions I and II, in each of which it allows a predetermined maximum flow of fluid from the pipe 8 to the reservoir 5 and from the source 4 to the pipe 8 respectively. In addition, the valve 39 can take up a range of positions III between these two end positions I and II. Within the range of positions III the flow of fluid from the pipe 8 to the reservoir 5 can be progressively reduced, starting from the maximum flow in the position I.

Figure 4:
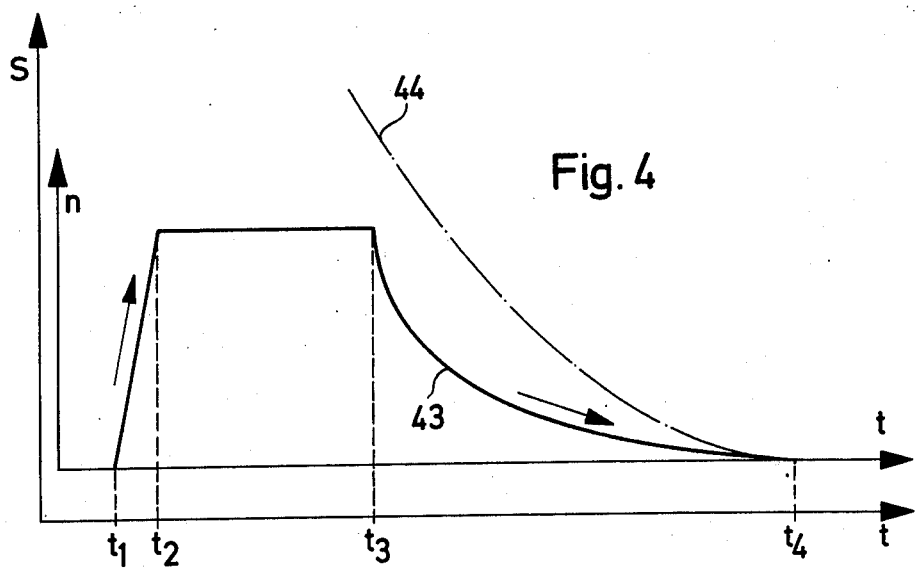
FIG. 4 is a graphical illustration of the manner of operation of the apparatus of FIG. 3.

The manner of operation of the embodiment of FIG. 3 is as follows and is shown in FIG. 4. When the clutch is to be disengaged the servo valve 39, controlled by the device 7, is shifted to the position II so that fluid passes from the source 4 through the pipe 8 to the ram 1 and the pistons 23 and 24 are moved apart. This takes place between the instant $t_1$ and $t_2$ in FIG. 4, which shows the sequence of movement for the embodiment of FIG. 3 in the same way as FIG. 2 showed the sequence for the embodiment of FIG. 1.

The inclination of the straight line between the instants $t_1$ and $t_2$, i.e. the rate of movement of the piston 24, depends on that rate of flow of fluid which is allowed by the valve 39 in its position II.

When the clutch is to be re-engaged, then, under the control of the device 7, the servo valve 39 is shifted back to the position I so that the piston 24 and thereby the piston 23 shift back into the ram cylinder. The engagement of the clutch starts at the instant $t_3$. The servo valve 39 is now continuously displaced within the range of positions III, being controlled by the device 7 so that it follows the instantaneous axial position of the piston 24, and hence of the piston 23, in the ram cylinder, as sensed by the inductive transducer 42, so that we obtain the curve 43 shown in FIG. 4, which preferable follows a logarithmic function. At the instant $t_4$ the clutch is fully engaged.

Instead of the inductive transducer 42 in the embodiment of FIG. 3 the control device 7 could also control the servo valve 39 by being connected to a speed indicating device which ascertains the instantaneous speed difference $n$ between the two relatively movable members of the clutch, the course of this speed difference in relation to time $t$ being indicated in FIG. 4 by the curve 44. The control device 7 is then programmed accordingly.

One could also arranged a combination of the two embodiments of FIGS. 1 and 3 in such a way that instead of the shut-off valve 11 with its associated primary valve 18 and the flow regulator 12 in the embodiment of FIG. 1, one employs a servo valve which has a range of positions III like the servo valve 39 and is mechanically shifted by the piston rod 25 of the piston 23 so that it produces, for example, the curve 43 of FIG. 4.

The device according to the invention achieves such control of the disengaging and engaging sequence of a friction clutch that completely smooth and shockfree operation is possible and indeed it is independent of the prevailing temperature of the fluid pressure medium which is employed, that medium normally being hydraulic oil.

It will be understood that various changes in the details, materials and arrangements of parts which have been herein described and illustrated in order to explain the nature of the invention may be made by those skilled in the art within the principle and scope of the invention, as expressed in the appended claims.

What is claimed is:

1. Means for electrohydraulically actuating a clutch comprising:
   a fluid reservoir;
   a source of pressurized fluid;
   hydraulic actuating motor means for actuating said clutch;
   fluid carrying means connected to said hydraulic actuating motor, said fluid reservoir and said source of pressurized fluid to provide pressure fluid to actuate said hydraulic motor means;
   said fluid carrying means connected to said hydraulic actuating motor means comprise first and second discharge lines disposed in parallel relation communicating with said reservoir and said hydraulic actuating motor means;
   fluid actuated control valve means connected with said fluid carrying means to control a flow of pressure fluid with respect to said hydraulic actuating motor means;
   said fluid actuated control valve means comprise:
     a fluid actuated shut-off valve in said second discharge line; and
     first viscosity-independent flow regulator means in said first discharge line;
   first electrically actuated control valve means connected with said fluid carrying means and said fluid actuated control valve means to control said fluid actuated control valve means;
   viscosity-independent flow regulator means operatively connected in said control valve means to regulate fluid flow with respect to said hydraulic motor means;
   electrical means to control said electrically actuated control valves means; and
   means connecting said first electrically actuated valve means to said electrical means to actuate said first electrically actuated valve means.

2. The means for electro-hydraulically actuating a clutch according to claim 1 further comprising a restriction in said first discharge line down stream of said first viscosity-independent flow regulator.

3. Means for electrohydraulically actuating a clutch comprising:
   a fluid reservoir;
   a source of pressurized fluid;
   hydraulic actuating motor means for actuating said clutch;
   fluid carrying means connected to said hydraulic actuating motor, said fluid reservoir and said source of pressurized fluid to provide pressure fluid to actuate said hydraulic motor means;
   fluid actuated control valve means connected with said fluid carrying means to control a flow of pressure fluid with respect to said hydraulic actuating motor means;
   said fluid actuated control valve means comprise:
     first fluid actuated control valve means receiving fluid flow to and from said hydraulic actuating motor means;
     hydraulic rectifier means disposed between said first actuated control valve means and said hydraulic actuating motor means; and
   first electrically actuated control valve means connected with said fluid carrying means and said fluid actuated control valve means to control said fluid actuated control valve means;
   viscosity-independent flow regulator means operatively connected to said control valve means to regulate fluid flow from said hydraulic motor means;
   electrical means to control said electrically actuated control valve means; and
   means connecting said first electrically actuated valve means to said electrical means to actuate said first electrically actuated valve means; second viscosity independent flow regular means disposed in said hydraulic rectifier means.

4. The means for electro-hydraulically actuating a clutch according to claim 3 wherein;
   said fluid carrying means connected to said hydraulic actuating motor means comprise first and second discharge lines disposed in parallel relation communicating with said reservoir and said hydraulic motor means;

said fluid actuated control valve means comprise;

a fluid actuated shut-off valve in said second discharge line; and first viscosity-independent flow regulator means in said first discharge line.

5. The means for electro-hydraulically actuating a clutch according to claim 5 wherein said control valve means further comprise:

first electrically actuated valve means;

means connecting said first electrically actuated valve means between said source of fluid pressure and said first control valve means to actuate said first control valve means;

means connecting said first electrically actuated valve means to said electrical means to actuate said first electrically actuated valve means;

second electrically actuated valve means;

means connecting said second electrically actuated valve means between said source of fluid pressure and said shut-off valve in said second discharge line, to actuate said shut-off valve; and means connecting said scond electrically actuated valve means to said electrical means to actuate said second electrically actuated valve means.

6. The means for electro-hydraulically actuating a clutch according to claim 7 wherein said electrical means comprise switch means connected to said hydraulic actuating motor means to actuate said first and second electrically actuated valve means in response to said hydraulic actuating motor means.

* * * * *